Dec. 18, 1945.  L. G. HOWELL  2,391,093
RADIOACTIVITY WELL-LOGGING
Filed Aug. 12, 1938  2 Sheets-Sheet 2
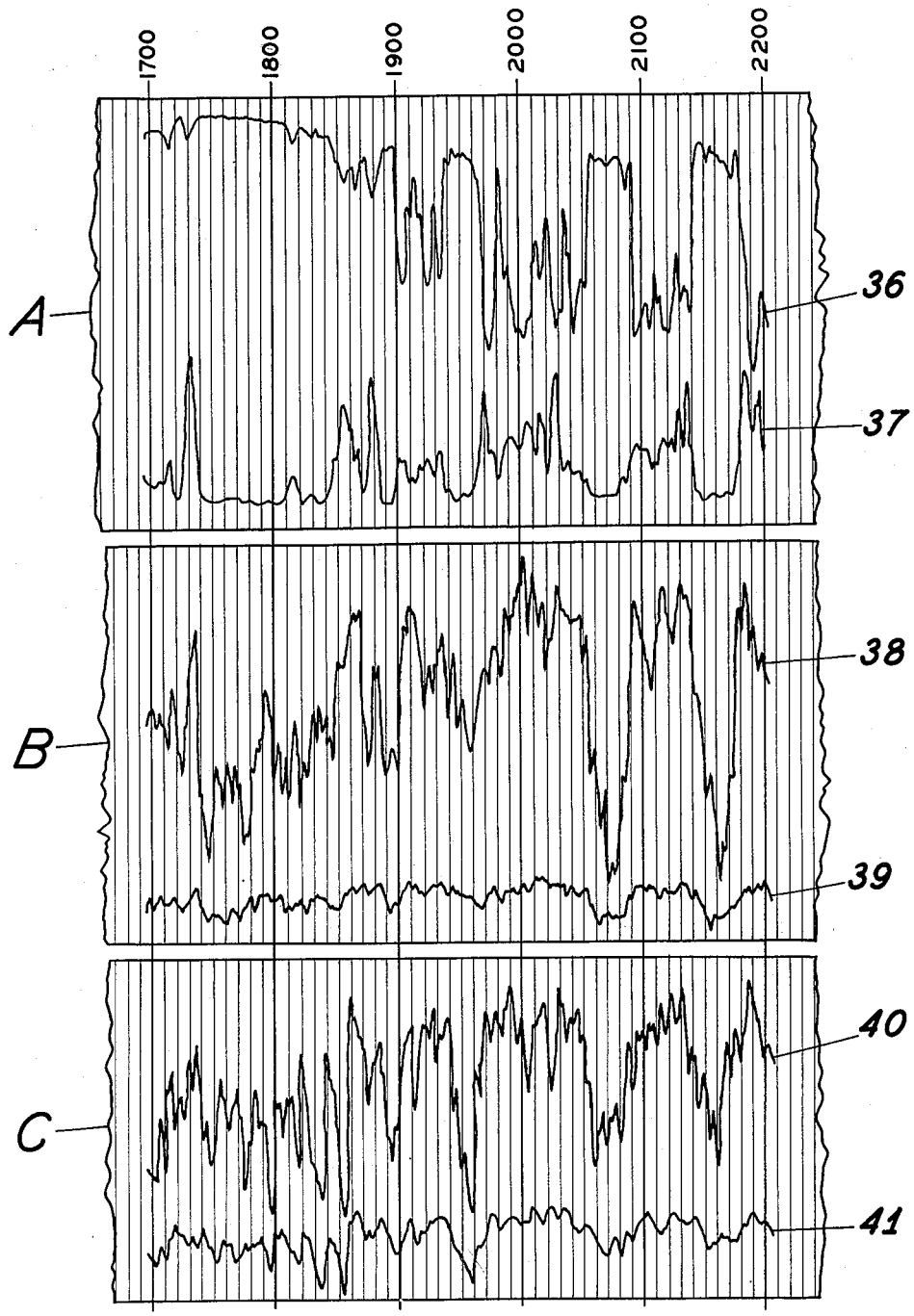
FIG_3_
INVENTOR.
Lynn G. Howell
BY
J. K. Small ATTORNEY.

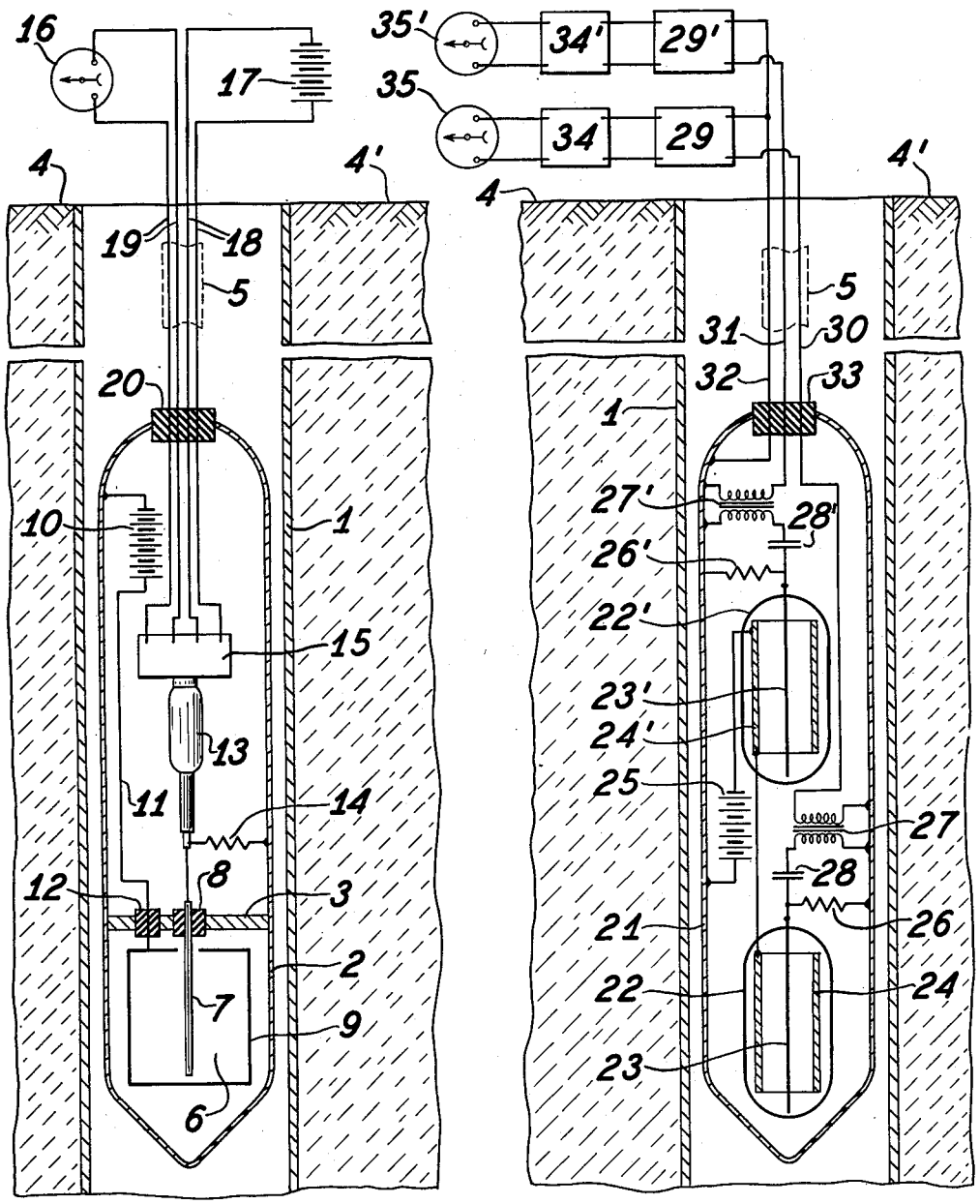

Patented Dec. 18, 1945

2,391,093

UNITED STATES PATENT OFFICE 2,391,093

RADIOACTIVITY WELL-LOGGING

Lynn G. Howell, Houston, Tex., assignor to Standard Oil Development Company, a corporation of Delaware Application August 12, 1938, Serial No. 224,504

9 Claims. (Cl. 250—83.6)

This invention relates to the logging of bore holes by measuring the radioactivity of the geologic layers traversed by the bore hole, either before or after casing is set. The radioactive intensity of the geologic layers gives valuable clues regarding their nature and contents and permits of correlating strata between bore holes and of delineating geologic structure.

In an earlier method of radioactivity well-logging, samples were taken from the well-bore and examined for radioactivity. This method suffers from the serious disadvantages that, unless these samples are obtained from cores, their exact position in the hole before removal can never be known definitely; futher, if the samples are obtained from the cuttings they are exposed to the washing action of the drilling fluid on their way upward in the borehole; finally, it is impossible by this method to obtain any information about the radioactivity of the strata after the hole has been cased.

The present invention relates to the measuring of the radioactivity directly inside the bore hole by lowering a radiation sensitive instrument in the hole. The radioactivity can be recorded either inside the instrument in the bore hole or at the surface. For many reasons immediately apparent to those familiar with the art, it is obviously desirable to record at the surface, and the figures given later in this specification depict apparatus and means for recording at the surface. The invention is not, however, restricted to surface recording.

Radioactive substances emit three types of radiation, namely alpha-rays, beta-rays, and gamma-rays. The gamma-rays are most useful in well-logging, because they are most penetrating. Penetration is a very important factor, because the radiation-sensitive instrument must be mounted inside a case with sufficiently thick walls to withstand the high pressures, reaching 8,000 pounds per square inch, in the bore hole and also, because it is desirable to make measurements inside the well casing. Oftentimes as many as three strings of casing are set in bore holes, and the radiation to be measured must necessarily be sufficiently penetrating to reach the instrument with ample intensity for satisfactory recording after penetrating these three casing strings and the wall of the instrument.

In one embodiment of this invention, an ionization chamber is utilized for measuring the gamma-ray intensity. This ionization chamber may be filled with a gas, such as nitrogen, to a pressure of about 500 pounds per square inch. An electrometer vacuum tube is used for measuring the ionization current which is conducted to the surface from the instrument by means of insulated conductors connecting the electrometer tube circuit with the surface, where the readings can either be read visually by reflecting light from a galvanometer mirror onto a scale or by directing the beam of light after reflection from the galvanometer onto a moving strip of photographic paper or film.

It is often advantageous to substitute for the above described hookup, involving a D. C. circuit, an A. C. amplifier. In this arrangement, the grid of the electrometer tube is grounded at regular intervals by means of a clockwork, and the pulses so produced, which are proportional to the intensities of the gamma-rays, are amplified. With this arrangement, drift troubles and other difficulties due to the high resistances in the circuit, which require extremely well made and insulated cable connections, are eliminated. The amplified pulses are read or recorded at the surface by means of a galvanometer. This system suffers from the disadvantage that the instrument must be moved very slowly in the hole or point to point readings must be taken.

Two Geiger counters are used in the preferred embodiment of this invention. The counters are mounted inside a case, and each counter has a separate leak and a transformer coupled to its separate amplifier and frequency meter at the surface. The frequency meter output currents are individually recorded photographically by reflecting light from two galvanometers on a moving strip of photographic paper or film. Thus, two independent records, which can be compared with each other, are obtained simultaneously. The high potential batteries which are necessary for the counters may either be placed at the surface or they may be mounted inside the instrument case with the counters. On account of the high voltage which is required to assure satisfactory sensitivity, it is preferable to mount the batteries in the instrument case; it has been found that when the batteries are placed at the surface, difficulties are sometimes encountered on account of insulation failures in the cable. Using this preferred embodiment, continuous records may be obtained with electrode speeds in the hole of twenty-five feet per minute. It will be apparent to those familiar with the art that this recording speed can be increased by the use of larger Geiger counters and higher amplification.

Two embodiments of the invention are shown in the figures accompanying this specification.

Fig. 1 illustrates the embodiment using an ionization chamber.

Fig. 2 shows the preferred embodiment using two Geiger counters with the counter batteries mounted in the instrument case.

Fig. 3 shows: A, a record obtained with an electric well-logging system; B, a record obtained in the same portion of the hole with the preferred embodiment of this invention before the hole was cased; and C, a record obtained two days later after the hole had been cased.

In Fig. 1, numeral 1 designates a casing in a bore hole; 2 is the instrument case which is divided into two compartments by a partition 3. The instrument is lowered into the bore hole 1 from the surface 4, 4' by means of a cable 5 carrying two pairs of conductors 18 and 19. An ionization chamber 6 is mounted inside the instrument case 2. The electrode 7 is located in the center of the ionization chamber 6 and is carried to the chamber through the partition 3 by means of insulator 8 which is preferably made of amber or some other good insulating material. The wall 9 of the ionization chamber 6 constitutes the outer electrode which is maintained at a high potential with respect to the inner electrode 7 by means of the battery 10. The high potential is applied to the outer electrode 9 by means of the conductor 11 which is insulated from the partition 3 by insulator 12. The grid element of an electrometer tube 13 is connected to electrode 7 and to the wall of the instrument case 2 by means of a high resistance 14. The elements of the electrometer tube 13 are connected to the balancing resistance bank 15. Electrical connection to a galvanometer 16 and batteries 17 is made through two pairs of conductors 18 and 19 inside of cable 5. The cable 5 is insulated from the case 2 by means of insulator 20.

The apparatus shown in Fig. 1 operates as follows: The penetration of gamma-rays into the ionization chamber 6 ionizes the gas in the chamber, thus changing the current through the resistance 14, thereby changing the voltage on the grid of the electrometer tube 13 and causing a change in the plate current of the tube. This change in plate current is indicated at the surface by causing a deflection of the galvanometer 16 and may be read visually or it may be recorded by any suitable means known to the art. The sensitivity of the ionization chamber may be increased by using a chamber of larger diameter, thus increasing the distance between inner electrode 7 and outer electrode 9, or by increasing the pressure of the gas inside the chamber 6, since the ionization produced by gamma-rays traversing the tube is increased by increasing the number of gas molecules between the two electrodes. The instrument case 2 is lowered in the bore hole and readings are taken either continuously or from point to point depending on the reaction time of the recording system. The instrument case 2 is shown inside the casing 1 in Fig. 1; it is understood that the apparatus is equally effective in an open hole.

In Fig. 2, the instrument case 21 is shown in the bore hole provided with casing 1. Inside the instrument case are two Geiger counters 22 and 22' provided with collecting wires 23 and 23' and outer electrodes 24 and 24'. The outer electrodes are maintained at a high negative potential by means of a battery 25, the positive terminal of which is connected to the wall of the casing 21, while the negative terminal is connected to the outer electrodes 24 and 24' of the two Geiger counters 22 and 22'. The collecting wires 23 and 23' are connected to the wall of the instrument case 21 by means of high resistances 26 and 26' and to one winding of transformers 27 and 27' through condensers 28 and 28'. The other windings of these transformers are connected from the wall of the instrument case 21 to amplifiers 29 and 29' through the cable 5 by means of the conductors 30 and 31. The amplifiers 29 and 29' are grounded to the wall of the instrument case 21 through the conductor 32. The conductors 30, 31, and 32 are insulated from the instrument case by means of an insulator 33.

The output wires of the amplifiers 29 and 29' lead to the frequency meters 34 and 34' which are in turn connected to galvanometers 35 and 35'.

Whenever gamma-rays pass through the Geiger counters, the resulting ionization causes the transmission of pulses through the transformers, to the amplifiers, and to the frequency meters; the deflections of the galvanometers are proportional to the average pulse rates of the counters. The galvanometer deflections are thus proportional to the number of gamma-rays per unit time and may be observed visually or photographed.

In Fig. 3, A shows two curves, 36 of the natural potential, and 37 of the impedance, logged in a bore hole in the Thompson oil field between 1700 and 2200 feet. Curves 38 and 39 were obtained in the same hole, while it was open, with apparatus built according to the preferred embodiment of the present invention. The lower counter 22 of Fig. 2 was connected to the galvanometer which gave curve 39, while the upper counter 22' gave the curve 38. A higher overall sensitivity was used in the system comprising counter 22'—galvanometer 35'. The record C was obtained two days later, after casing had been set in the hole. As is easily apparent from the record, a higher overall sensitivity was used in the system which gave the curve 40.

Contrary to expectations, oil and gas sands are less radioactive in the Gulf Coast than shales. It is to be expected that oil and gas in sands relatively close to the basement rocks would exhibit large changes of gamma-ray activity. The three well-logs shown in Fig. 3 show a fairly close, but not perfect, correlation between electrical properties and gamma-ray intensity, the gamma-ray intensity being low in those formations in which the impedance and the natural potential are high. A comparison of records B and C shows a very close correlation. Since one of these records, B, was obtained in the open hole while the other, C, was logged in the same hole after it had been cased, it requires no further proof to conclude that the presence of the casing did not deleteriously affect the recording of the gamma-rays. This is to be expected, since the wall of the instrument case 2 was made of steel one-fourth of an inch thick.

It is to be understood that the present invention is not restricted to the particular apparatus disclosed, but contemplates the use of other types of apparatus for measuring, observing, or recording the radioactivity of the formations traversed by bore holes. Particularly, the invention is not restricted to gamma-ray well-logging but contemplates radioactive well-logging in general. In other words, the appended claims are not restricted to the specific apparatus and procedure described above, but are intended to cover the present invention as broadly as the prior art permits. As employed in the following claims, the term "observing" shall include visually observing, measuring, and recording.

I claim:
1. A method of measuring radiation that comprises subjecting a compressed gaseous medium, in the presence of radiation, to a constant electrical potential sufficient to cause a continuous current flow proportional to the intensity of said radiation, continuously measuring said current flow without appreciably altering the potential on the gaseous medium, and continuously recording the measurement.

2. Method of geophysical prospecting that comprises exposing a compressed gaseous medium, within a geological formation, to radiation emanating from said formation; subjecting the medium to a constant electrical potential sufficient to cause a continuous current flow proportional to the intensity of said radiation; continuously measuring said current flow without appreciably altering the potential on the gaseous medium; and continuously recording the measurement.

3. Method of geophysical prospecting that comprises exposing a compressed gaseous medium within a geological formation, to radiation emanating from said formation; subjecting the medium to a constant electrical potential sufficient to cause a continuous current flow proportional to the intensity of said radiation; continuously measuring said current flow without appreciably altering the potential on the gaseous medium; and continuously recording the measurement in correlation with indications of the place of measurement.

4. Method of geophysical prospecting that comprises positioning an envelope containing a compressed gaseous medium within a well bore whereby the medium is exposed to radiation emanating from surrounding geological formations, subjecting the medium to a constant electrical potential sufficient to cause a continuous current flow through said medium proportional to the intensity of said radiation; continuously measuring said current flow without appreciably altering the potential on the gaseous medium; and continuously recording the measurement in correlation with indications of the depth within the well bore at which the measurement was made.

5. A method of measuring radiation that comprises subjecting a gaseous medium at a pressure of the order of one hundred to five hundred pounds per square inch, in the presence of radiation, to a constant electrical potential sufficient to cause a continuous current flow proportional to the intensity of said radiation, continuously measuring said current flow without appreciably altering the potential on the gaseous medium, and continuously recording the measurement.

6. A method of measuring radiation that comprises subjecting nitrogen at a pressure of the order of one hundred to five hundred pounds per square inch, in the presence of radiation, to a constant electrical potential sufficient to cause a continuous current flow proportional to the intensity of said radiation, continuously measuring said current flow without appreciably altering the potential on the nitrogen and continuously recording the measurement.

7. Apparatus for measuring radiation that comprises a radiation-transparent envelope, a compressed gaseous medium within said envelope, means for subjecting said medium to a constant electrical potential sufficient to cause a continuous current flow proportional to the intensity of radiation in the vicinity of said envelope, means for continuously measuring said current flow without appreciably altering the potential on the gaseous medium, and means for continuously recording the measurement.

8. Apparatus for geophysical prospecting that comprises a metallic envelope substantially transparent to short-wave length radiation emanating from geological formations, compressed nitrogen within said envelope, means for subjecting the compressed nitrogen to a constant electrical potential sufficient to cause a continuous current flow proportional to the intensity of said radiation in the vicinity of said envelope, means for continuously measuring said current flow without appreciably altering the potential on the compressed nitrogen, and means for continuously recording the measurement.

9. Apparatus for geophysical prospecting that comprises a metallic envelope substantially transparent to short-wave length radiation emanating from geological formations nitrogen at a pressure of the order of one hundred to five hundred pounds per square inch within said envelope, means for subjecting the compressed nitrogen to a constant electrical potential sufficient to cause a continuous current flow proportional to the intensity of said radiation in the vicinity of said envelope, means for continuously measuring said current flow without appreciably altering the potential on the compressed nitrogen, and means for continuously recording the measurement in correlation with indications of the place at which the measurement was made.

LYNN G. HOWELL.